U

United States Patent [19]

Mumme

[11] 3,947,682

[45] Mar. 30, 1976

[54] APPARATUS FOR MEASURING ANGULAR DISPLACEMENT

[75] Inventor: Clarence D. Mumme, Phoenix, Ariz.

[73] Assignee: Sperry Rand Corporation, New York, N.Y.

[22] Filed: Dec. 10, 1974

[21] Appl. No.: 531,265

[52] U.S. Cl. ......... 250/231 R; 250/209; 250/231 SE
[51] Int. Cl.² ........................................ G01D 5/34
[58] Field of Search ... 250/231 R, 231 SE, 231 GU, 250/237 R, 231 P, 214 R, 209

[56] References Cited
UNITED STATES PATENTS

| 3,491,246 | 1/1970 | Dooley et al. | 250/231 P |
| 3,780,297 | 12/1973 | Geary | 250/231 R |
| 3,783,277 | 1/1974 | Younkin et al. | 250/237 R |

Primary Examiner—Alfred E. Smith
Assistant Examiner—D. C. Nelms
Attorney, Agent, or Firm—Howard P. Terry; Arthur W. Fisher

[57] ABSTRACT

Apparatus for measuring angular displacement of an object in which an alternating potential source is applied to the electrodes of a light source, such as a gaseous discharge light, resulting in alternating illuminations in the medium, e.g., gas, about the respective electrodes, which are detected by photodetector means. The light source and the photodetector means are mounted such that the distances between the photodetector and the respective electrodes vary proportionately with any rotation of the object whose angular displacement is being monitored. The output signals from the photodetector means are separated and compared and, in response thereto, a signal is generated indicative of the angular displacement of the object.

8 Claims, 4 Drawing Figures

APPARATUS FOR MEASURING ANGULAR DISPLACEMENT

BACKGROUND OF THE INVENTION

1. Field of the Invention

The invention pertains to optical systems for detecting angular displacement and more particularly to a novel device utilizing a gaseous discharge lamp and a photodetector to measure angular displacement.

2. Description of the Prior Art

Optical systems for measuring angular displacement presently in use and in particular, those systems used as pick-offs for gyroscopic instruments, have succeeded in resolving the limitations inherent in the more conventional systems. Specifically, conventional pick-offs, synchros, or the like, add additional weight to the system and produce a coupling or counter torque which introduces error and further necessitates the use of additional energy to compensate for the increased drag on the gimbal system. Prior art optical systems suffer from other limitations. In particular, prior art optical systems for measuring angular displacement in gyroscopic instruments are composed of numerous parts which require extensive and intricate machining in their manufacture and assembly thereby adding substantial cost and production time to the manufacture of the gyroscopic instrument. For example, see U.S. Pat. No. 3,313,161 entitled "Means for Measuring Relative Angular Displacement", U.S. Pat. No. 3,422,686 entitled "Optical Pick-Off Means for Deriving Signals Indicative of Deviation of Rotor Pole from Spin Axis" and U.S. Pat. No. 3,813,949 entitled "Light Actuated Solid State Pick-Off."

It is apparent, then, that a device is needed to measure angular displacement which is reliable, economical, and not subject to the limitations indicated above.

SUMMARY OF THE INVENTION

Apparatus for measuring angular displacement of an object in which a light source, such as a gaseous discharge light, which includes a pair of electrodes with a medium situated therebetween and in which an illumination occurs when a potential of sufficient magnitude is applied across the electrodes, and where the illumination is confined to the medium about the electrode which is coupled to the more negative polarity of the potential source. An alternating potential source is applied to the electrodes to create alternating illuminations in the medium about the respective electrodes. A photodetector is utilized for detecting the illuminations about both of the electrodes and, in response thereto, generates output signals proportionate to the distances between the photodetector and the respective electrodes. The light source and the photodetector are disposed such that the distances between the photodetector and the electrodes vary relative to the angular displacement of the object in a manner such that for any variation in the distance between the photodetector and one of the electrodes, there will occur a corresponsive, proportional and inverse variation in the distance between the photodetector and the remaining electrode. The output signals from the photodetector associated with the illuminations about the electrodes are separated and compared and a response is generated therefrom indicative of the angular displacement of the object.

DESCRIPTION OF THE PREFERRED EMBODIMENT

Figure 1:
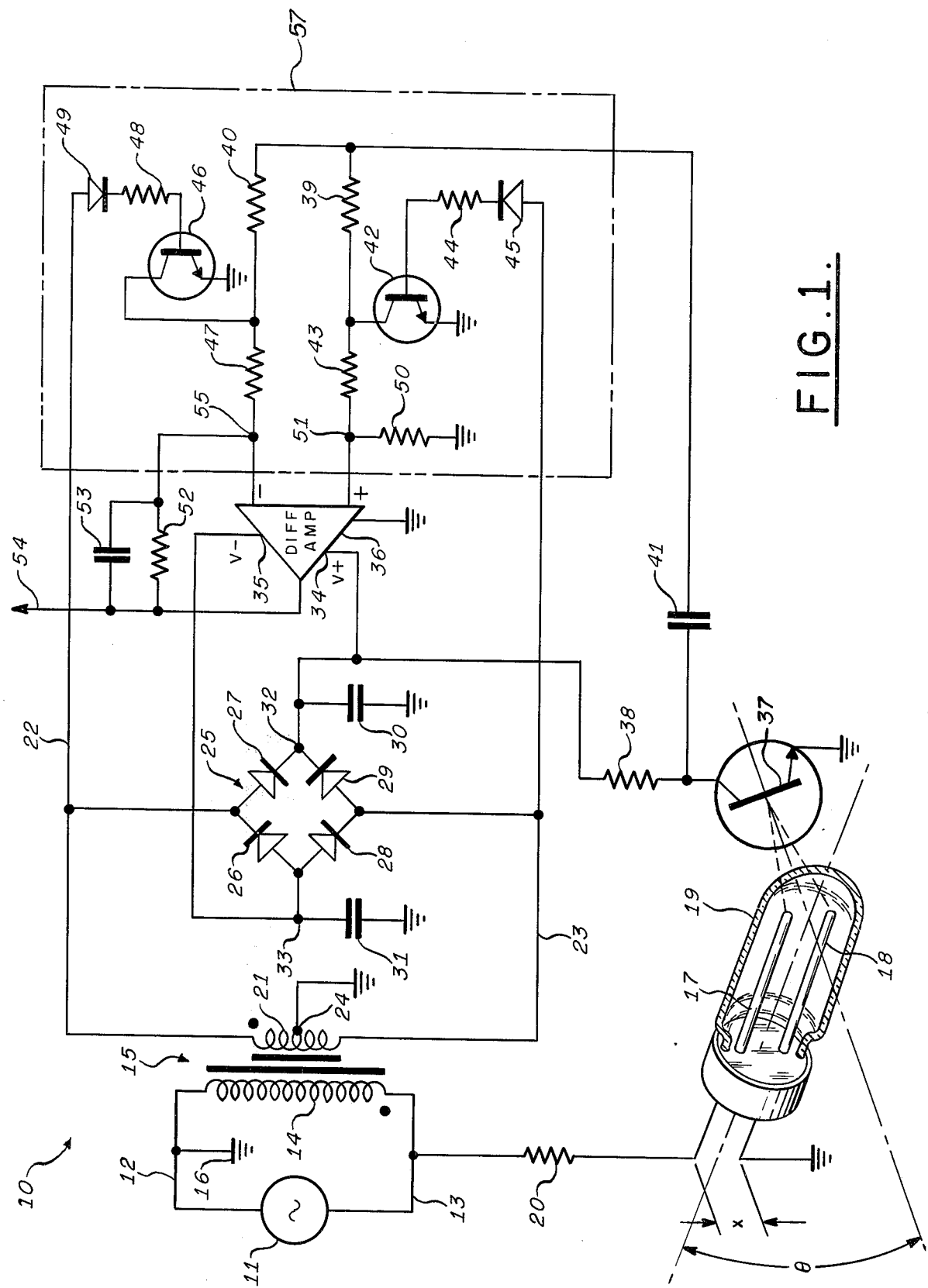
FIG. 1 is a schematic diagram depicting the circuitry which comprises the invention.

FIG. 1 depicts schematically the circuit 10 of the present invention. A potential source 11 is connected to the leads 12 and 13 of the primary 14 of a transformer 15. One of the two leads 12 is coupled to a common connection 16, hereinafter referred to as ground. A first electrode 17 and a second electrode 18 of a gaseous discharge lamp 19 are coupled to the energy source 11 in series with a resistor 20. The secondary 21 of transformer 15 is connected between leads 22 and 23 with a center tap 24 connected to ground 16. A bridge rectifier 25, composed of diodes 26, 27, 28 and 29 is connected between leads 22 and 23. A pair of capacitors 30 and 31 are connected to a pair of leads 32 and 33, respectively, which are in turn respectively connected to a positive potential reference 34 and a negative potential reference 35 of a differential amplifier 36. Lead 32 is further coupled to the collector of a phototransistor 37 in series with a resistor 38. The collector of phototransistor 37 is coupled to resistors 39 and 40 through a capacitor 41. The collector of a transistor 42 is connected to the junction of resistors 39 and 43. The emitter of transistor 42 is connected to ground 16 and the base of transistor 42, in series with a resistor 44 and a diode 45, is coupled to lead 23. The collector of a transistor 46 is connected to the junction of resistors 40 and 47. The emitter of transistor 46 is connected to ground 16 and the base of transistor 46 in series with a resistor 48 and a diode 49, is coupled to lead 22. One lead of a resistor 50 is connected to the junction of resistor 43 and the positive reference input 51 of differential amplifier 36 and the remaining lead of resistor 50 is connected to ground 16. The parallel combination of a resistor 52 and a capacitor 53 is connected between the output 54 of differential amplifier 36 and the junction of resistor 47 and the negative reference input 55 of differential amplifier 36.

The gaseous discharge lamp 19 consists of an enclosure, typically cylindrical, housing two electrodes 17 and 18 in a gaseous medium. The enclosure is sealed and composed of a translucent material, which is preferably transparent. The electrodes 17 and 18 are coplanar and non-contiguous and are preferably separated for a substantial proportion of their mutual length by a distance X which remains essentially constant. The gaseous medium, typically in an inert gas such as neon, is capable of producing light when excited by the passage of an electric current through it.

An excitation voltage is applied to electrodes 17 and 18 of the gaseous discharge lamp 19 from energy source 11. Initially, in order to achieve conduction within the lamp together with the accompanying illumination, a high potential, with respect to that required to maintain conduction, is required. For example, if a neon light is utilized, the point at which conduction initiates will typically occur at approximately 70 volts. A characteristic of gaseous discharge lamps is the negative current-voltage relationship exhibited during conduction and which requires the use of a device, such as resistor 20, to limit the current through the lamp. A second characteristic inherent in this device and which is essential for the operation of the invention, is the fact that illumination will occur within the lamp only in the area circumjacent to the electrode coupled to the more negative polarity of the potential source. For example, if lead 13 is positive with respect to lead 12, and the amplitude of the potential across leads 12 and 13 has exceeded the level necessary to initiate conduction within the lamp 19, then, only the gas within lamp 19 circumjacent to electrode 18 will be illuminated, while the gas circumjacent to electrode 17 will be extinguished. If an alternating potential source is utilized, then, during each cycle there will occur within the lamp 19 two separate illuminations, one of which is circumjacent to electrode 17 and the other circumjacent to electrode 18.

Figure 2:
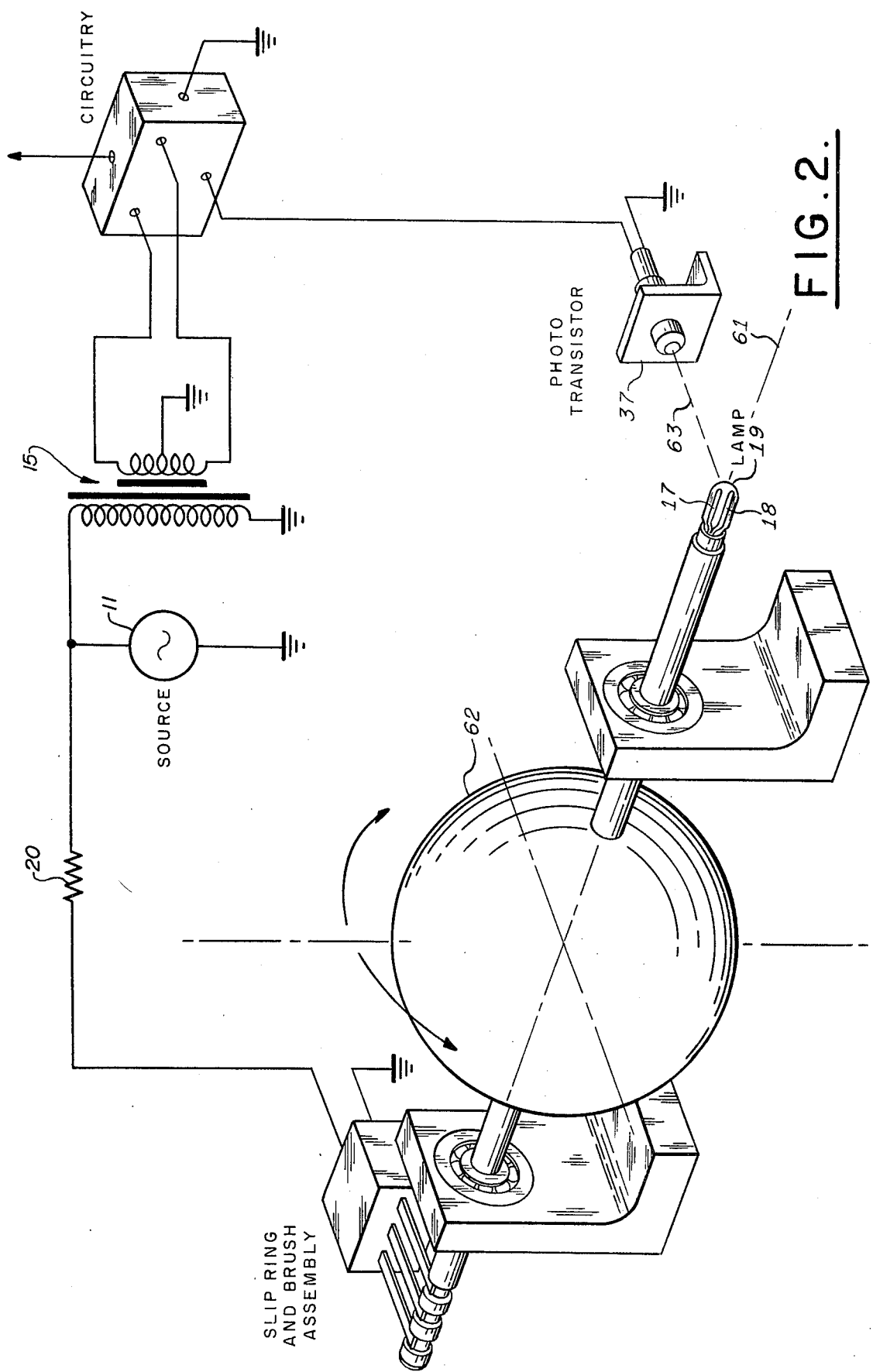
FIG. 2 is a diagram depicting a rotatable device adapted for incorporation of the invention.

FIG. 2 depicts gaseous discharge lamp 19 mounted on a device 62 whose angular displacement is to be measured. In FIG. 2 the axis of rotation 61 for the device 62 whose angular displacement is to be measured, coincides with an axis which is coplanar to electrodes 17 and 18 and equi-distant therefrom. Therefore, gaseous discharge lamp 19 will rotate simultaneously with the device 62 whose angular displacement is to be measured about axis 61. Furthermore, each electrode will remain a fixed distance, $X/2$, from the axis of rotation 61.

Phototransistor 37 is positioned in a manner such that the axis 63 of its photodetecting means 64 is perpendicular to the axis of rotation 61 and tangential to the center line of the electrodes 17 and 18 of gaseous discharge lamp 19. Phototransistor 37 will detect the illuminations circumjacent to each electrode and convert the same into an electrical signal at its collector 56. The magnitude of the electrical signal generated by phototransistor 37 is dependent on the intensity of the illumination detected by the photodetecting means 64. Moreover, the intensity of the illumination detected by the photodetecting means 64 is directly dependent on the distance of the electrode from the photodetecting means. For example, if electrodes 17 and 18 lie in a plane normal to the axis 63 of the photodetecting means 64 of phototransistor 37, then the magnitude of the electrical signals generated by phototransistor 37 for the illuminations circumjacent to both electrodes will be identical, since the electrodes are equidistant from the photodetecting means 64. If, however, the lamp 19 is rotated about axis 61 such that electrode 17 is physically closer to the photodetecting means 64 than electrode 18, then the magnitude of the electrical signal generated by phototransistor 37 will be proportionately greater for the illumination circumjacent to electrode 17 than for that generated for the illumination circumjacent to electrode 18. By determining the difference between the magnitudes of the signals generated for these illuminations, the angular displacement and the direction of rotation can be monitored.

FIG. 1 depicts schematically the circuitry comprising the invention 10. Energy source 11 provides an alternating potential with which the invention may be operated. The frequency of oscillation for the energy source is not critical and typically would incorporate the standard 400 hertz utilized in a wide variety of gyroscopic instruments. The amplitude of the potential source 11 must be sufficient to cause conduction within the gaseous discharge lamp 19.

Energy source 11 is coupled to gaseous discharge lamp 19 and to the primary 14 of transformer 15. Transformer 15 is a step-down transformer employed to reduce the potential amplitude of energy source 11 to a level compatible with the remaining circuitry of the invention 10. The secondary 21 of transformer 15 is connected to leads 22 and 23. Connected between leads 22 and 23 is a bridge rectifier assembly 25 which in cooperation with capacitors 30 and 31 provide positive and negative reference voltages for the differential amplifier 36. Additionally, rectifier assembly 25 and capacitor 30 cooperate to provide a filtered potential source for phototransistor 37. Bridge rectifier assembly 25 is preferably a unitary assembly of conventional form but may consist of discrete components as indicated by diodes 26, 27, 28 and 29.

The alternating illuminations emanating from gaseous discharge lamp 19 and detected by phototransistor 37 cause a modulated signal to appear at the collector 56 of phototransistor 37. The modulated signal is indicative of the relative intensities of the respective illuminations detected by phototransistor 37. The modulated signal is coupled through capacitor 41 to a demodulator circuit 57 composed of resistors 39, 40, 43, 44, 47, 48 and 50, diodes 45 and 49, and transistors 42 and 46. The demodulator operates to separate the respective signals, that is, to distinguish the signals associated with the illuminations circumjacent to electrode 17 from the signals associated with the illuminations circumjacent to electrode 18.

During the periods when the gas circumjacent to electrode 18 is illuminated, lead 13 will be positive with respect to lead 12. At this time, lead 22 will be positive with respect to center tap 24. Furthermore, lead 23 will be negative with respect to center tap 24. Therefore, a biasing current will flow from lead 22 through the diode 49 and resistor 48 to the base of transistor 46 and return to ground via the emitter of transistor 46. The presence of this biasing current will cause the collector-to-emitter junction of transistor 46 to switch from the non-conducting state to the conducting state, thereby shunting to ground, any potential energy present at the junction of resistors 40 and 47. Moreover, since electrode 23 is negative with respect to the center tap 24, i.e., ground, diode 45 is reversed biased and prevents the flow of biasing current to the base-emitter junction of transistor 42. The collector-to-emitter junction of transistor 42 will remain in the non-conducting state and any potential energy present at the junction of resistors 39 and 43 will be unaffected by transistor 42. In this manner, demodulator circuit 55 directs the signals, generated by phototransistor 37 in response to illuminations circumjacent to electrode 18, to the negative reference input 55 of differential amplifier 36. In similar fashion, the demodulator circuit directs the signals, generated by phototransistor 37 in response to illuminations circumjacent to electrode 17, to the positive reference input 51 of differential amplifier 36.

Differential amplifier 36 differentially sums the signals present at the negative reference input 55 and the positive reference input 51, amplifies the difference and couples the amplified difference to lead 54. Since the signals corresponding to the illuminations circumjacent to electrodes 17 and 18 do not occur simultaneously, the parallel combination of resistor 52 and capacitor 53 is utilized to integrate the output signal with respect to the signal received at the negative reference input terminal 55. The integrator is composed of resistor 52 and capacitor 53 and operates to filter both the output of the differential amplifier 36 coupled to lead 54 and the signal present at the negative reference input terminal 55 of differential amplifier 56. The integrator will maintain a reference voltage at the negative reference input terminal 55 for differential summing purposes in conjunction with the periodic signal directed to the positive reference input terminal 51. The values of resistor 52 and capacitor 53 should be chosen such that the RC time constant is very large with respect to the period of the frequency of oscillation of energy source 11. This results in an output signal on lead 54 which can be maintained in substantially linear form over 180 degree segments of rotation of the device 62 whose angular displacement is being measured.

Additionally, any inequality between the illuminations circumjacent to electrodes 17 and 18 may be compensated for, if desired, within the apparatus by a number of methods. For example, the values of the resistors in demodulator circuit 57 coupled to the negative reference input 55 or the positive reference input 51 of amplifier 36 may be varied, thereby altering the gain and compensating for the inequality accordingly.

Figure 3:
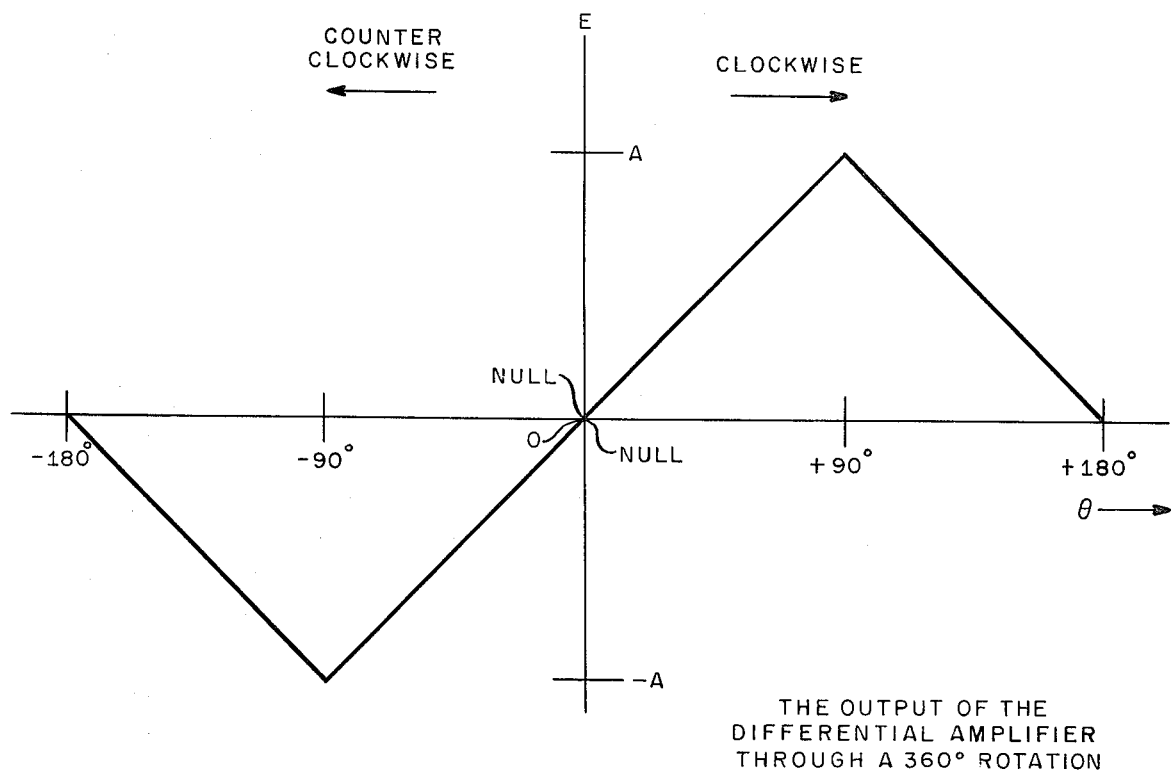
FIG. 3 is a graphic diagram illustrating the output signal of the invention with respect to the angular displacement of the rotatable device.

FIG. 3 graphically illustrates the linearity of the output signal level present on lead 54 for the full 360 degrees of rotation of the device 62 whose angular displacement is being measured. As indicated in FIG. 3, the signal level for the null position is zero, wherein, the null position occurs when electrodes 17 and 18 are equidistant from the photodetecting means 64 of phototransistor 37. As the device 62, whose angular displacement is being measured, is rotated in the clockwise direction as depicted in FIG. 2, the distance between phototransistor 37 and electrode 17 decreases, while the distance between phototransistor 37 and electrode 18 increases. The signal level on the output lead 54 of differential amplifier 36 begins to increase linearly and continues to increase until the device 62 has rotated through +90°. At this point, i.e., +90°, the photodetecting means 64 of phototransistor 37 and both electrodes 17 and 18 lie within the same plane and therefore the distance between phototransistor 37 and electrode 17 is at a minimum while conversely the distance between phototransistor 37 and electrode 18 is at a maximum.

Further clockwise rotation of the device 62 whose angular displacement is being measured will result in a linear reduction of the output signal from differential amplifier 36 since the distance between phototransistor 37 and electrode 17 begins to increase while the distance between phototransistor 37 and electrode 18 begins to increase. A similar result will occur when a counterclockwise rotation of the device 63 whose angular displacement is being measured resulting in a negative output signal from differential amplifier 36 with respect to the null value as indicated by FIG. 3.

Figure 4:
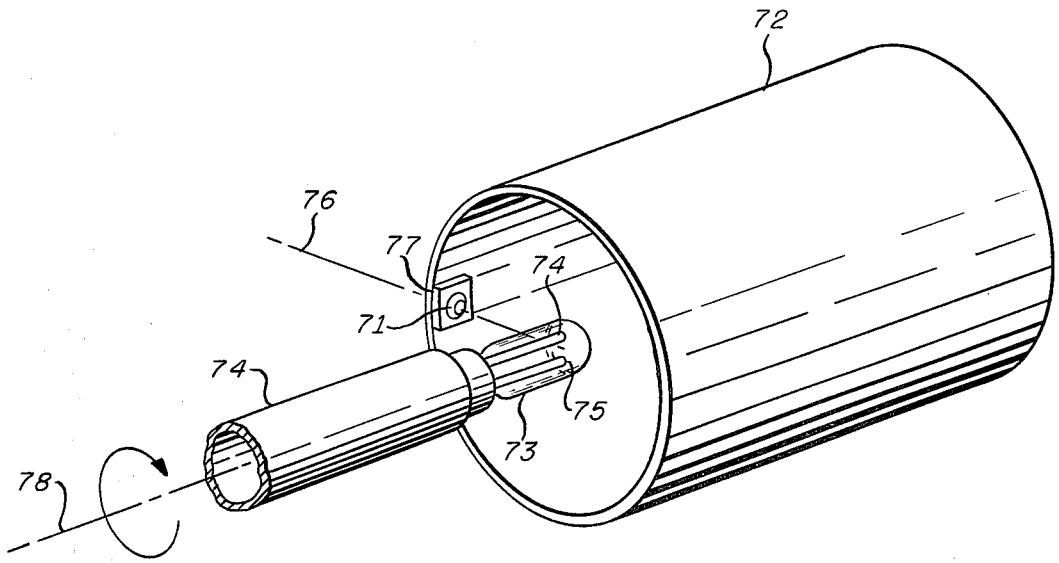
FIG. 4 is a diagram depicting a rotatable device adapted for incorporation of the invention in a manner different from that of FIG. 2.

It should be noted that while the invention has been described as an embodiment wherein the gaseous discharge lamp 19 is affixed to the rotatable device 62 whose angular displacement is being measured, the invention is not limited to this configuration but instead may encompass a variety of mountings. For example, consider the configuration of FIG. 4. Phototransistor 71 is affixed to the inner wall of a rotatable cylindrical member 72 whose angular displacement is to be measured. Gaseous discharge light 73 is mounted to a stationary holder 74 and disposed so that electrodes 74 and 75 lie in a plane pependicular to the axis 76 of the photodetecting means 77 of phototransistor 71, and further disposed so that the center line of electrodes 74 and 75 coincides with the axis of rotation 77 of cylindrical member 72. It is apparent that the same principle utilized for the configuration of FIG. 2 is utilized in FIG. 4, that is, as cylindrical member 72 rotates about axis 77, phototransistor 71 is maintained at a fixed distance from the center line of electrodes 74 and 75 while the distances between phototransistor 71 and electrode 74 and between phototransistor 71 and electrode 75 will inversely vary relative to the direction of rotation of cylindrical member 72. It should be further noted that in some situations it may be advantageous to monitor the illuminations about each electrode separately and it should be apparent that this result is easily accomplished by the incorporation of a second phototransistor.

It will be appreciated, therefore, that the invention is a device for measuring angular displacement. The invention exploits the characteristics of the gas discharge lamp to provide a reliable and economical angular displacement measuring device. The output is in linear d.c. form and therefore does not require demodulation, rectification, etc. Furthermore, the invention overcomes the need for the intricate machining of a plurality of parts coupled with an involved and complicated alignment procedure. Additionally, the device is adaptable to virtually any rotating device in a variety of configurations as opposed to confinement to a single shape or configuration.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. Apparatus for measuring angular displacement of an object comprising:

light source means including a first electrode means and a second electrode means with a medium therebetween and in which, in response to a potential source applied across said first and second electrode means, an illumination occurs in the medium about whichever of the first or second electrode means is coupled to the more negative polarity of the potential source, means for alternating the polarity of the potential source applied across said first and second electrode means, photodetecting means for detecting the alternating illuminations about said first and second electrode means and generating output signals relative to the distance between the photodetecting means and said first electrode means and between the photodetecting means and said second electrode means, means for mounting said light source means and said photodetecting means such that the distances between the photodetecting means and said first electrode means and between the photodetecting means and said second electrode means vary relative to the angular displacement of the object in a manner such that for any variation in distance between the photodetecting means and the first electrode means, there is a related variation in the distance between the photodetecting means and the second electrode means.

2. The apparatus of claim 1 wherein means are provided for separating said signals generated by said photodetecting means in response to the illuminations about said first electrode means from the signals generated in response to the illuminations about said second electrode means.

3. The apparatus of claim 2 further including means for comparing said separated signals responsive to said illuminations about said first and second electrode means and generating therefrom an output indicative of the angular displacement of the object.

4. The apparatus of claim 1 wherein the light source means consists of a gaseous discharge light.

5. The apparatus of claim 1 wherein the light source means consists of a neon lamp.

6. The apparatus of claim 1 wherein the photodetecting means consists of a phototransistor.

7. Apparatus for measuring angular displacement of an object comprising:
light source means including a first electrode means and a second electrode means with a medium therebetween and in which, in response to a potential source applied across said first and second electrode means, an illumination occurs in the medium about whichever of the first or second electrode means is coupled to the more negative polarity of the potential source,
means for alternating the polarity of said potential source applied across said first and second electrode means,
first detecting means for detecting the illuminations about said first electrode means and generating output signals relative to the distance between the first photodetecting means and the first electrode means,
second photodetecting means for detecting the illuminations about said second electrode means and generating output signals relative to the distance between the second photodetecting means and the second electrode means,
means for mounting said light source means and said first and second photodetecting means such that distances between the first photodetecting means and said first electrode means and between the second photodetecting means and said second electrode means vary relative to the angular displacement of the object in a manner such that for any variation in the distance between the first photodetecting means and the first electrode means, there is a related variation in the distance between the second photodetecting means and the second electrode means.

8. The apparatus of claim 7 further including means for comparing the signals generated by said first photodetecting means with the signals generated by said second photodetecting means and producing therefrom an output indicative of the angular displacement of the object.

* * * * *